S. A. ELY.
SECTIONAL STEEL VAULT.
APPLICATION FILED SEPT. 28, 1916.
1,218,248.
Patented Mar. 6, 1917.
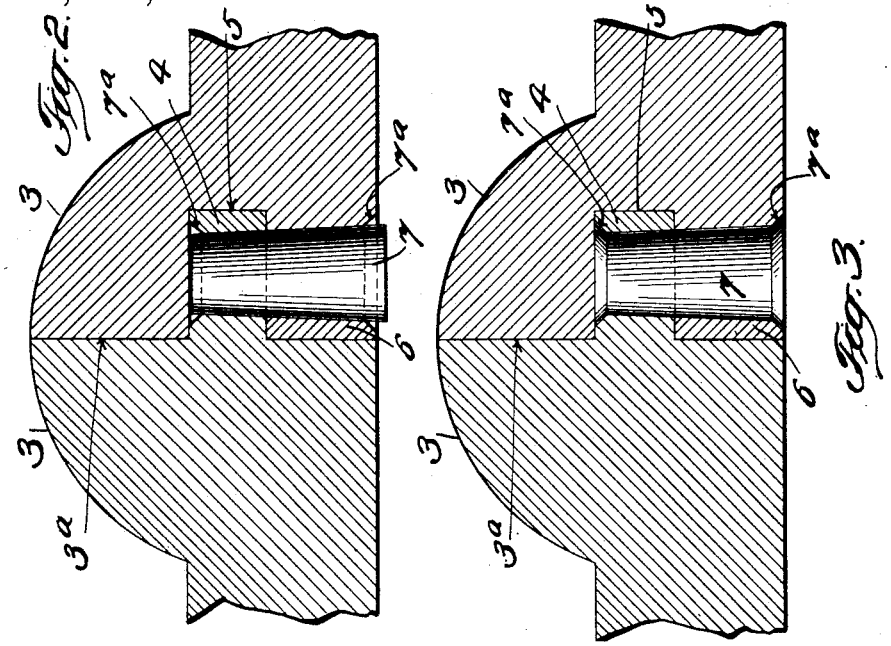
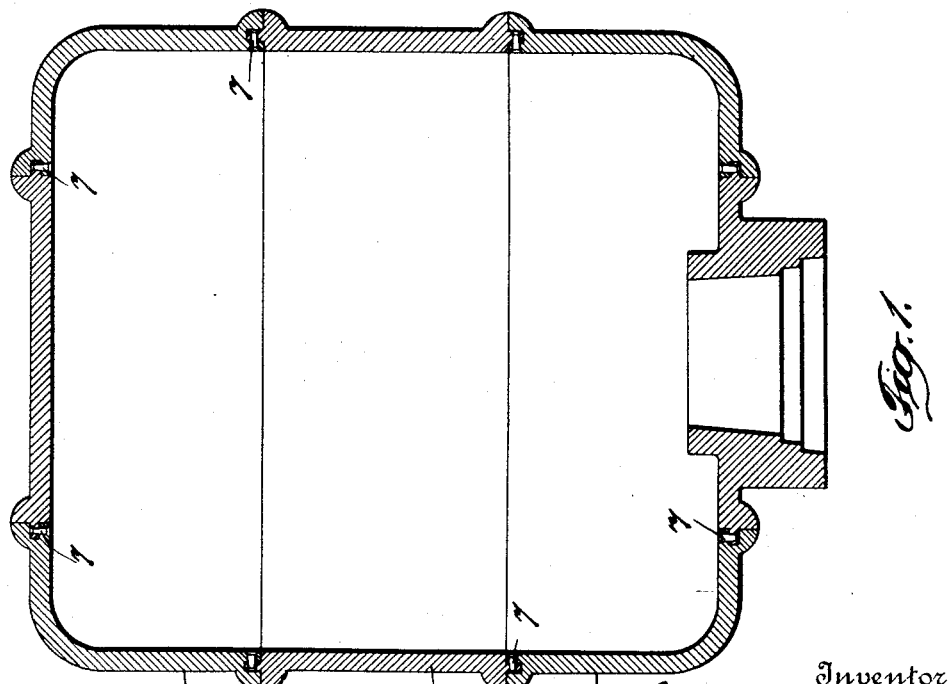
Inventor
Sumner A. Ely,
By his Attorneys

UNITED STATES PATENT OFFICE.

SUMNER A. ELY, OF NEW YORK, N. Y.

SECTIONAL STEEL VAULT.

1,218,248.     Specification of Letters Patent.     Patented Mar. 6, 1917.

Application filed September 28, 1916. Serial No. 122,593.

*To all whom it may concern:*

Be it known that I, SUMNER A. ELY, a citizen of the United States, and resident of the borough of Manhattan, city, county, and State of New York, have invented certain new and useful Improvements in Sectional Steel Vaults, of which the following is a specification.

One of the main objects of this invention is to provide a joint especially adapted for connecting together the outer wall plates of safes and vaults, the invention being designed for use in the construction of burglar-proof steel vaults wherein the outer walls of the vault are made up of a number of steel sections rigidly and permanently connected together.

Another important object of the invention is to provide a riveted joint for a vault construction, wherein the rivets will not be exposed upon the outer side of the vault.

A further important object of the invention is to provide a riveted joint wherein one head of each of the rivets will be upset within the body of the structure and wholly inclosed thereby, one end only of the rivet being exposed, and that end being within the vault.

Another object of the invention is to provide a riveted joint for vault constructions, wherein the rivet will be slightly tapered and somewhat softened at its smaller end, and to so construct the meeting ends of the vault plates that they telescope and interlock one within the other in such manner that one end of the rivet may be upset and inclosed within the wall of the joint.

There are other objects and advantages of the invention, all of which will appear hereinafter or be obvious to those skilled in the art of vault construction.

In the drawing, Figure 1 is a horizontal sectional view of a vault embodying my improved joint;

Fig. 2 an enlarged section of the joint before the securing rivet is upset; and

Fig. 3 a view similar to Fig. 2, showing the rivet upset and the joint complete.

Referring to the various parts by numerals, 1 designates a vault formed of a plurality of sections 2. At the meeting ends of the sections are formed external ribs or enlargements 3 having square meeting faces 3ª. These meeting faces are smooth and abut together very closely in order to form a smooth tight joint.

The meeting end of one section of the vault is formed with a forwardly projecting flange 4 the outer face of which is in the same plane as the outer face of the section. This flange 4 is adapted to enter a corresponding groove 5 formed in the meeting end of the adjoining section between the respective inner faces of the enlargement 3 and the flange 6 on the latter section. The forward end of the flange 6 abuts against the end of the adjoining section and forms a flush joint directly in line with the meeting faces 3ª of the enlargements 3. The interlocked flanges 4 and 6 are apertured to receive rivets 7, said rivets being tapered from their inner ends to their outer ends, the larger ends being within the vault structure. The apertures in the flanges 4 and 6 are tapered to correspond with the taper of the rivets, and, of course, this taper may be of any suitable degree. The flanges 4 and 6 are formed with countersinks 7ª; and the rivets are of such material that their ends may be upset in said countersinks. The inner ends of the rivets rest against the inner face of one of the enlargements on the vault sections, and when the rivets are driven inwardly said enlargement serves in the nature of an anvil against which the smaller end of each rivet is driven and upset by force applied to the end of the rivet within the vault structure. As shown in Fig. 3, the opposite ends of the rivets are upset in the corresponding countersinks 7ª, the smaller ends of the rivets being within the body of the vault wall and entirely inclosed and protected thereby. The meeting faces of the enlargements or ribs form a very tight joint between the vault sections, and prevent the introduction of explosive material between the vault sections and around the riveted connection.

It is manifest that the vault sections may be made in any suitable shape and size, and that the interlocking flanges may be of any construction. It is essential, however, that a sufficient body of metal be provided to serve as an anvil against which the outer end of the rivet may be upset, and which will serve as an efficient protection to the outer side of the riveted joint. It is, of course, obvious that this outside reinforcement of the joint may be of any desired shape and of any desired extent. It is also obvious that the vault sections may be of any suitable material, such as steel. I prefer, however, that the rivets shall be made of chromed vanadium steel, the ends being sufficiently soft to permit of their being upset in the riveting operation.

It will, of course, be understood that any other suitable form of fastening means may be employed in place of the rivets.

What I claim is:

1. A vault comprising metal sections, a riveting flange on the meeting end of one section, the meeting end of the adjoining section being formed with a groove to receive said flange, the overlapped portions of the sections being apertured, fastening devices fitting in said apertures, enlargements formed on the exterior of the sections along the joint thereof, the meeting faces of said enlargements fitting closely together and the enlargement on one section covering one end of the fastening device, the other end of the fastening device being within the vault.

2. A vault comprising metal sections, a connecting flange on the meeting end of one section, the meeting end of the adjoining section being formed with a groove to receive said flange, said flange and the inner overlapping portion of the adjoining section being apertured, fastening devices fitting in said apertures, one end of each of said fastening devices being headed against outer wall of said groove, the other end of each of said fastening devices being within the vault.

3. A vault construction comprising metal sections, a connecting flange on the meeting end of one section, the meeting end of the adjoining section being formed with a groove to receive said flange, said flange and the inner overlapping portion of the adjoining section being apertured, fastening devices fitting in said apertures, one end of each of said fastening devices being concealed within the wall, the other end of each of said fastening devices being within the vault, whereby the fastening devices will not be exposed on the exterior of the vault.

4. A vault construction comprising metal sections, a connecting flange on the meeting end of one section, the meeting end of the adjoining section being formed with a groove to receive said flange, said flange and the inner overlapping portion of the adjoining section being apertured, rivets fitting in said apertures, one end of each of said rivets being upset and headed against one wall of said groove, the other end of each of said rivets being headed within the vault.

5. A vault construction comprising metal sections, a connecting flange on the meeting end of one section, the meeting end of the adjoining section being formed with a groove to receive said flange, said flange and the inner overlapping portion of the adjoining section being apertured, said apertures tapering from the inner side of the vault outwardly, tapered rivets fitting said apertures, one end of each of said rivets being upset and headed against one wall of said groove, the other end of each of said rivets being headed within the vault.

6. A vault construction comprising metal sections, a riveting flange on the meeting end of one section, the meeting end of the adjoining section being formed with a groove to receive said flange, the overlapped portions of the sections being formed with outwardly tapered apertures, tapered rivets fitting said apertures, enlargements formed on the exterior of the metal sections along the joint thereof, the meeting faces of said enlargements fitting closely together and the enlargement on one section covering one end of each of said rivets and forming an anvil against which the ends of the rivets may be upset and headed within the vault wall, the other end of each of said rivets being headed within the vault.

7. A wall formed of a plurality of metal sections, a connecting flange on the meeting end of one section, the meeting end of the abutting section being formed with a groove to receive said flange, said flange and the inner overlapping portion of the adjoining section being apertured, fastening devices fitting in said apertures, one end of each of said fastening devices being concealed within the wall, the other end of each of said fastening devices being exposed on the inner side of the wall, whereby the fastening devices will not be exposed on the exterior of the wall.

In testimony whereof I hereunto affix my signature.

SUMNER A. ELY.

Copies of this patent may be obtained for five cents each, by addressing the "Commissioner of Patents, Washington, D. C."